(12) United States Patent
Farison et al.

(10) Patent No.: US 11,139,255 B2
(45) Date of Patent: Oct. 5, 2021

(54) PROTECTION OF INTEGRATED CIRCUITS

(71) Applicants: STMicroelectronics (Rousset) SAS, Rousset (FR); STMicroelectronics (Grenoble 2) SAS, Grenoble (FR)

(72) Inventors: Denis Farison, Le Tholonet (FR); Romain Coffy, Voiron (FR); Jean-Michel Riviere, Froges (FR)

(73) Assignees: STMicroelectronics (Rousset) SAS, Rousset (FR); STMicroelectronics (Grenoble 2) SAS, Grenoble (FR)

(*) Notice: Subject to any disclaimer, the term of this patent is extended or adjusted under 35 U.S.C. 154(b) by 0 days.

(21) Appl. No.: 16/411,960

(22) Filed: May 14, 2019

(65) Prior Publication Data
US 2019/0355674 A1 Nov. 21, 2019

(30) Foreign Application Priority Data
May 18, 2018 (FR) ...................... 1854155

(51) Int. Cl.
| H01L 23/52 | (2006.01) |
| H01L 23/00 | (2006.01) |
| H01L 21/56 | (2006.01) |
| H01L 23/528 | (2006.01) |
| H01L 25/065 | (2006.01) |
| H04L 9/00 | (2006.01) |

(52) U.S. Cl.
CPC .......... *H01L 23/576* (2013.01); *H01L 21/563* (2013.01); *H01L 23/528* (2013.01); *H01L 24/09* (2013.01); *H01L 24/32* (2013.01); *H01L 24/48* (2013.01); *H01L 25/0657* (2013.01); *H01L 2224/32145* (2013.01); *H01L 2224/4824* (2013.01); *H01L 2224/48091* (2013.01); *H01L 2224/49112* (2013.01); *H01L 2225/06555* (2013.01); *H01L 2924/14* (2013.01); *H04L 9/002* (2013.01)

(58) Field of Classification Search
CPC combination set(s) only.
See application file for complete search history.

(56) References Cited

U.S. PATENT DOCUMENTS

| 2003/0122237 A1* | 7/2003 | Saeki ................. H01L 23/3128 257/686 |
| 2003/0148597 A1* | 8/2003 | Tan ........................ H01L 24/29 438/612 |
| 2003/0153122 A1* | 8/2003 | Brooks ............... H01L 25/0657 438/107 |

(Continued)

FOREIGN PATENT DOCUMENTS

| TW | I331379 B | 10/2010 |
| WO | 2012087580 A2 | 6/2012 |

OTHER PUBLICATIONS

INPI Search Report and Written Opinion for FR 1854155 dated Dec. 10, 2018 (8 pages).

*Primary Examiner* — Moin M Rahman
(74) *Attorney, Agent, or Firm* — Crowe & Dunlevy

(57) ABSTRACT

A first integrated circuit chip is assembled to a second integrated circuit chip with a back-to-back surface relationship. The back surfaces of the integrated circuit chips are attached to each other using one or more of an adhesive, solder or molecular bonding. The back surface of at least one the integrated circuit chips is processed to include at least one of a trench, a cavity or a saw cut.

10 Claims, 2 Drawing Sheets

(56) References Cited

U.S. PATENT DOCUMENTS

| | | | |
|---|---|---|---|
| 2004/0026768 A1* | 2/2004 | Taar | H01L 29/0657 |
| | | | 257/686 |
| 2009/0026592 A1* | 1/2009 | Kwang | H01L 23/3114 |
| | | | 257/676 |
| 2009/0091042 A1* | 4/2009 | Do | H01L 24/48 |
| | | | 257/777 |
| 2018/0033846 A1* | 2/2018 | Dykaar | H01L 27/3251 |
| 2020/0075501 A1* | 3/2020 | Raorane | H01L 24/49 |

* cited by examiner

PROTECTION OF INTEGRATED CIRCUITS

PRIORITY CLAIM

This application claims the priority benefit of French Application for Patent No. 1854155, filed on May 18, 2018, the content of which is hereby incorporated by reference in its entirety to the maximum extent allowable by law.

TECHNICAL FIELD

The present disclosure generally concerns electronic circuits and, more specifically, the protection of electronic circuits against back-side attacks.

BACKGROUND

In many applications, it is desired to protect data manipulated by an integrated circuit. This may be for confidentiality reasons, to avoid data piracy, frauds, etc. The circuits then execute protection processes generally implementing cryptographic, ciphering, signature, or other algorithms. The execution of such algorithms is protected by keys and various algorithmic countermeasures. Such protections aim at preventing a non-authorized user (a pirate) from accessing the data, the keys, or more generally the implementation of the algorithm.

Attacks may take various forms among which, for example, an interpretation of the signals supplied by the circuit, a side channel analysis (interpretation of power consumption traces or of the circuit radiation), etc. Attacks may also use fault injections, which comprise disturbing or setting bits or signals processed by the circuit to then interpret the circuit response.

A category of attacks more particularly targeted by the present disclosure concerns so-called back-side attacks. Such attacks comprise reaching active areas of the integrated circuit from the back side thereof, be it to inject faults (laser attacks), to directly measure a response of the circuit, etc. Such backside attacks require forming openings from the back side of the integrated circuit to reach the back of the active areas of the integrated circuit.

There is a need for an improvement of systems of protection of integrated circuits against back-side attacks.

SUMMARY

An embodiment overcomes all or part of the disadvantages of usual protections against back-side attacks.

An embodiment provides an assembly comprising at least two integrated circuit chips assembled back-to-back to each other.

According to an embodiment, the chips comprise electronic functions accessible from their respective front sides.

According to an embodiment, the chips are assembled to each other by a glue layer.

According to an embodiment, the glue is a glass paste.

According to an embodiment, at least one of the chips comprises a cavity on its back side.

According to an embodiment, the cavity is intended to receive the glue for assembling the chips together.

According to an embodiment, the cavity does not extend at the chip periphery.

According to an embodiment, the chips are assembled by an adhesive film.

According to an embodiment, the back sides of the chips are welded to each other.

According to an embodiment, the chips are assembled by molecular bonding.

According to an embodiment, at least one of the chips comprises, on its back side, sawing lines.

According to an embodiment, at least one of the chips comprises trenches on its back side.

An embodiment provides an electronic circuit comprising: a substrate; and at least one assembly such as described.

According to an embodiment: first contacts present on the front side of a first chip are soldered to second contacts of the substrate; and third contacts present on the front side of a second chip are coupled, by conductive wires, to fourth contacts of the substrate.

An embodiment provides a method of protecting a first integrated circuit chip against back-side attacks, wherein a second integrated circuit chip is assembled by its back side to the back side of the first chip.

BRIEF DESCRIPTION OF THE DRAWINGS

The foregoing and other features and advantages will be discussed in detail in the following non-limiting description of specific embodiments in connection with the accompanying drawings, wherein.

DETAILED DESCRIPTION

Figure 1:
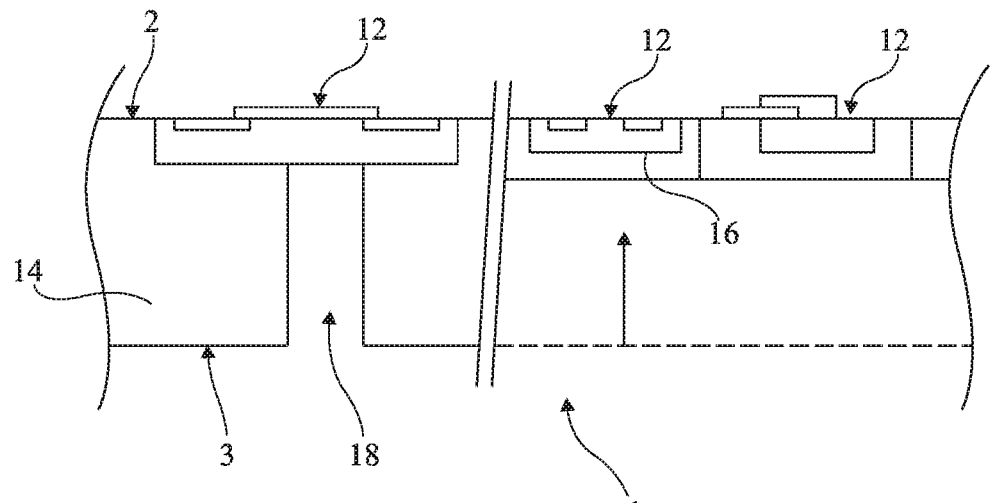
FIG. 1 is a very simplified cross-section view of an integrated circuit submitted to a back-side attack.

The same elements have been designated with the same reference numerals in the different drawings. In particular, the structural and/or functional elements common to the different embodiments may be designated with the same reference numerals and may have identical structural, dimensional, and material properties.

For clarity, only those steps and elements which are useful to the understanding of the described embodiments have been shown and are detailed. In particular, the functions of the integrated circuits have not been detailed, the described embodiments being compatible with usual functions and applications of any integrated circuit.

Throughout the present disclosure, the term "connected" is used to designate a direct electrical connection between circuit elements, whereas the term "coupled" is used to designate an electrical connection between circuit elements that may be direct, or may be via one or more intermediate elements. Unless indicated otherwise, when the term "coupled" is used, the connection can be implemented by a direct connection.

The terms "approximately", "about", and "in the order of" are used herein to designate a tolerance of plus or minus 10%, preferably of plus or minus 5%, of the value in question.

FIG. 1 is a very simplified cross-section view of two usual ways of etching the back side of an integrated circuit chip.

An integrated circuit chip 1 generally comprises various components, circuits, or more generally electronic functions 12, formed inside and/or on top of a front surface 2 of a substrate 14 generally at least partially made of a semiconductor material. Substrate 14 may be integrally made of a semiconductor material, for example, of silicon, or be formed of a stack comprising a semiconductor and an insulator (SOI—Silicon On Insulator, FDSOI, etc.). Functions 12 may take various shapes, they may be or not in semiconductor or insulating wells 16. A same chip 1 may comprise logic portions, analog portions, a mixture of both, and more or less complex functions. A back side 3 of the chip is generally deprived of any component, but may comprise a ground plane (not shown).

A back-side attack most often comprises mechanically or chemically removing all or part of the substrate from back side 3, to reach or to come closer to the active areas of the electronic functions. In the right-hand portion of FIG. 1, it is assumed that the entire substrate is removed (for example, by chemical-mechanical polishing). In the left-hand portion of FIG. 1, it is assumed that the attack forms a window 18 (for example, from a few tens to several hundreds of micrometers) in substrate 14 to reach the active area.

Once this mechanical, chemical, or chemical-mechanical step has been carried out, the attack comprises either a measurement or a modification of signals made accessible, or a local fault injection, for example, by laser. According to the thickness of substrate 14, a laser attack may sometimes be carried out from the back side of an integrated circuit chip, without even having to etch its back side.

Usual countermeasures against back-side attacks generally comprise integrating detection circuits, processing modifications of electric characteristics of layers buried in substrate 14.

According to the described embodiments, it is provided to use at least two integrated circuit chips and to assemble them by their back sides.

Figure 2:
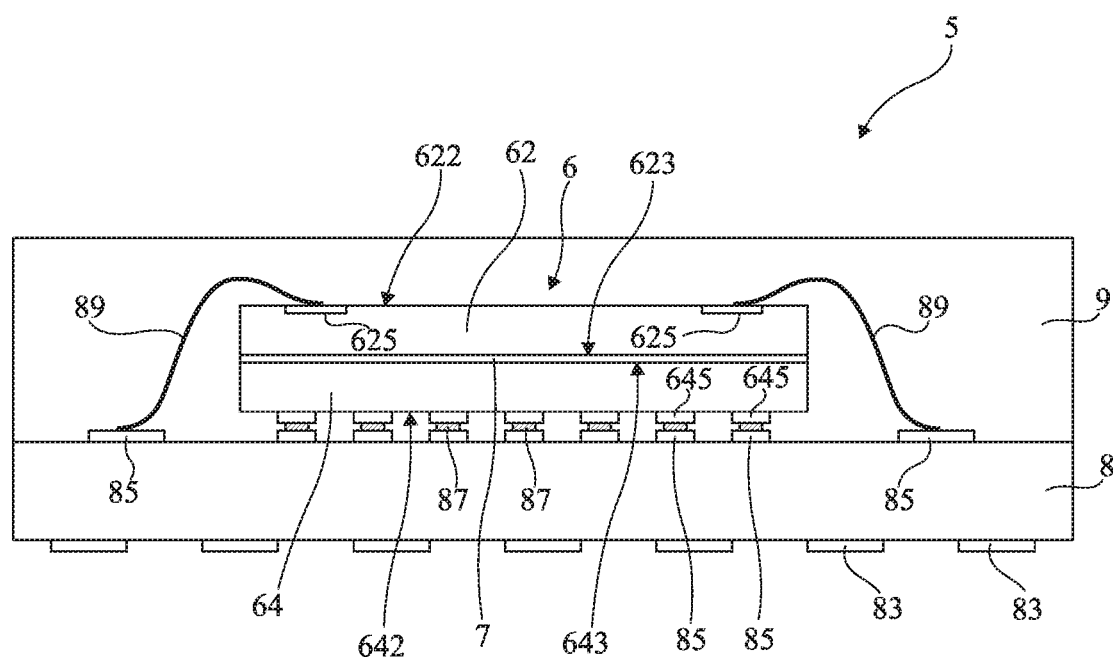
FIG. 2 is a very simplified cross-section view of an electronic circuit comprising an embodiment of an assembly of integrated circuit chips.

FIG. 2 is a very simplified cross-section view of an electronic circuit 5 comprising an embodiment of an assembly 6 of integrated circuit chips.

The assembly of chips 6 comprises at least two chips 62 and 64. In the shown example, the case of two integrated circuit chips 62 and 64 of identical dimensions is assumed. However, chips of different dimensions may be provided, or it may even be provided to assemble a plurality of chips by their back sides to the back side of a larger chip.

Chip 62 is manufactured in usual fashion and comprises, on its front side 622, contacts 625 intended to be used for a connection to other circuits, functions, etc. Chip 64 is manufactured in usual fashion and comprises, on its front side 624, contacts 645 intended to be used for a connection to other circuits, functions, etc. Usually, front sides 622 and 642 are the chip surfaces from which the electronic functions are implemented. Chips 62 and 64 of assembly 6 are assembled back to back, that is, their respective back sides 623 and 643 are facing each other.

FIG. 2 illustrates a layer 7 of a binder, for example, of glue, bonding back sides 623 and 643 of chips 62 and 64 to each other. Binder 7 may be a glue, an adhesive film, for example, of the type known as DAF (Die Attach Film), a molecular bonding, a glass frit bonding. It may also be provided, particularly if back sides 623 and 643 of chips 62 and 64 support conductive planes (for example, ground planes), to weld or solder these back sides together.

In the example of FIG. 2, it is assumed that assembly 6 is intended to be assembled on a support or wafer 8, for example, a printed circuit board (PCB) or the like. The wafer comprises conductive pads 85 intended to be coupled to contacts 625 and 645 of chips 62 and 64. Pads 85 couple the front side of wafer 8, for example, to contacts 83 on the back side of wafer 8. For chip 64 which, in the shown example, has its front surface 642 facing the (front) side of wafer 8 supporting contacts 85, the connection is preferably performed by direct soldering, for example, by means of a network of solder bumps 87 coupling conductive pads 645 on the front side of chip 64 to contacts 85 of wafer 8. For chip 62, having as a front surface 622 the surface of assembly 6 which is distal to wafer 8, the connection is preferably performed by conductive wires 89 coupling conductive pads 625 on the front side of chip 62 to contacts 85 of wafer 8. The assembly is then, for example, encapsulated in resin 9 to complete the package of electronic circuit 5 thus obtained. Circuit 5 is intended to be assembled to an electronic board comprising other systems and circuits.

The representation of FIG. 2 is simplified and is an example only. In particular, an assembly of chips 6, obtained according to the described embodiments, may be assembled in various ways usual per se on an electronic board.

According to an embodiment, the assembly of chips 62 and 64 is carried out with individual chips, that is, chips 62 and 64 are first obtained by cutting in a wafer of semiconductor material. According to another embodiment, the assembly is performed with a full wafer and the cutting is performed afterwards.

The obtained assemblies 6 are then assembled to wafer 8. Here again, the assembly may be performed before or after cutting of wafer 8.

According to a specific embodiment, chips 62 and 64 having a thickness of several tens of micrometers (for example, from approximately 50 to approximately 100 μm, preferably in the order of 70 μm) are provided and binder layer 7 has a thickness of a few micrometers (for example, from approximately 5 to approximately 40 μm, preferably in the order of 20 μm). Thus, once the assembly has been formed, it looks like a chip having contacts on both its surfaces.

Preferably, the functions usually present in a chip are distributed into the two assembled chips 62 and 64. Thus, even if a pirate does not attempt to separate the chips, but only to remove one of the two chips by polishing to reach the back side of the other chip, the destruction of the first chip makes the assembly non-functional and the attack is then doomed to fail.

Figures 3A, 3B:
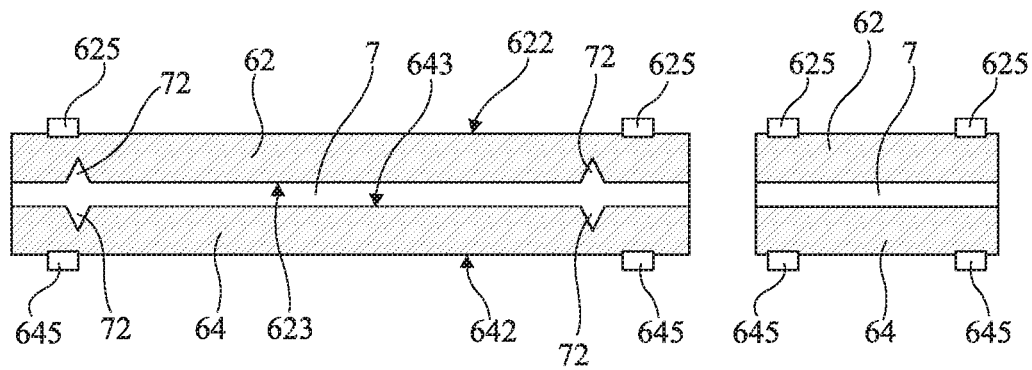
FIGS. 3A and 3B are very simplified views, respectively a cross-section and a side view, of another embodiment of a chip assembly.

FIGS. 3A and 3B are very simplified views, respectively a cross-section and a side view, of another embodiment of a chip assembly.

In FIGS. 3A, 3B, as well as in the following drawings, the chips have not been detailed and only the chips, the binder layer, and the contacts have been illustrated.

According to an embodiment of FIGS. 3A and 3B, sawing or cutting lines 72 are provided in the back sides of chips 62 and 64. The lines are for example formed on cutting of the chips to individualize wafers from which they are manufactured. It should be noted that this embodiment is compatible with an assembly in full wafers by having previously formed lines 72 in the back sides of the respective wafers. Once chips 62 and 64 have been assembled back to back, here, preferably by glue to fill the sawing lines, the external aspect of the obtained assembly 6 is similar to that having no lines (FIG. 2). The advantage of sawing lines 72 is to embrittle the chips if a pirate attempts to separate them. The chip breakage is thus favored in case of an attack. The number and the distribution of lines 72 depend on the desired size and brittleness. Further, in the case where the chip comprises a ground plane on the back side, lines 72 will preferably be formed at the chip periphery. Lines 72 have been shown vertically above one another, which improves the assembly and enables to compensate, over the formed assembly, for the brittleness individually brought to each chip. It may however be provided for lines 72 not to be, or to only partially be, vertically above one another.

Figures 4A, 4B:
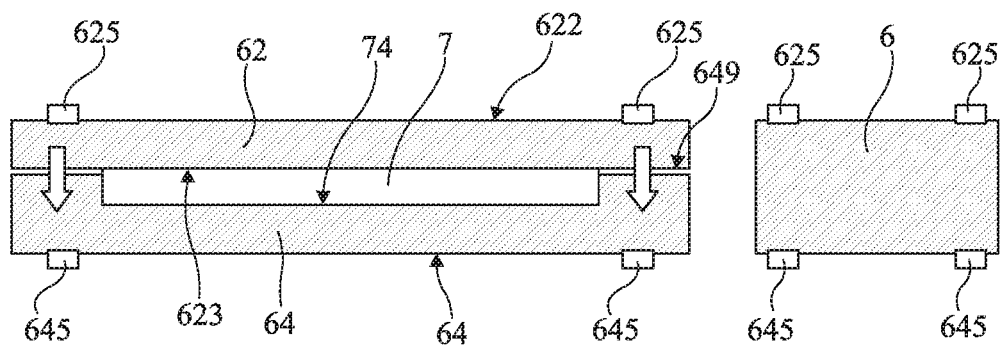
FIGS. 4A and 4B are very simplified views, respectively a cross-section and a side view, of another embodiment of a chip assembly.

FIGS. 4A and 4B are very simplified views, respectively a cross-section and a side view, of another embodiment of a chip assembly.

According to this embodiment, it is provided to form, from the back side of at least one of chips 62 and 64 to be assembled, a cavity 74. In the shown example, a cavity 74 is provided in back side 643 of chip 64. Cavity 74 is only present in the central portion of the chip, that is, back side 643 comprises a peripheral edge 649. Edge 649 is intended to bear against back side 623 of the other chip (here 62) and the cavity is intended to be filled with binder 7 (for example, with glue). Thus, once the assembly has been formed (FIG. 3B), it cannot be seen, or only with difficulty, that two chips are assembled. As a variation, a cavity 74 is formed on the back side of each chip 62, 64.

Figures 5A, 5B:
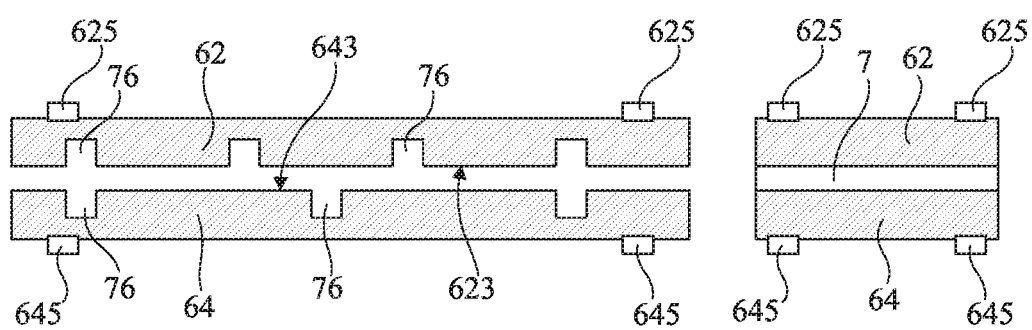
FIGS. 5A and 5B are very simplified views, respectively a cross-section and a side view, of another embodiment of a chip assembly.

FIGS. 5A and 5B are very simplified views, respectively a cross-section and a side view, of another embodiment of a chip assembly.

According to an embodiment, on manufacturing of chips 62 and/or 64, trenches 76 are formed from their respective back sides. The function of these trenches is, like for sawing lines 72 (FIG. 4A), to embrittle the chips to favor their breakage in case of an attack. The trenches 76 of a chip may or not be vertically above the trenches of the other chip.

An advantage of the described embodiments is that they prevent an upstream attack, that is, an attack attempt to separate the chips generates a destruction thereof and thus makes the attack inoperative.

An advantage of the described embodiments is that they require no modification of the actual chip and in particular no modification of the components and circuits formed inside, on top of, and from the front side.

An advantage of the described embodiments is that their implementation is independent from the manufacturing of the actual chips.

An advantage of the described embodiments is that they are compatible with existing countermeasures against back-side attacks. In particular, the chips may comprise back-side attack detection circuits such as, for example, conductive vias coupling the back side to front side detection circuits, resistive detection networks and, more generally, any usual circuit.

Various embodiments and variations have been described. These various embodiments and variations may be combined and other variations will occur to those skilled in the art. In particular, the selection of binder 7 depends on available technologies and on applications. Finally, the practical implementation of the described embodiments is within the abilities of those skilled in the art based on the functional indications given hereabove.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

The invention claimed is:

1. An assembly, comprising:
    a first integrated circuit chip having a front side and a back side, and including a first plurality of electrical contacts present at the front side of the first integrated circuit chip, wherein the back side of the first integrated circuit chip includes a first plurality of trenches and does not include any electrical contacts;
    a second integrated circuit chip having a front side and a back side, and including a second plurality of electrical contacts present at the front side of the second integrated circuit chip, wherein the back side of the second integrated circuit chip includes a second plurality of trenches and does not include any electrical contacts;
    wherein the first and second integrated circuit chips are assembled together with their back sides facing towards each other;
    wherein first ones of the first plurality of trenches are vertically aligned with first ones of the second plurality of trenches; and
    wherein second ones of the first plurality of trenches are not vertically aligned with second ones of the second plurality of trenches.

2. The assembly of claim 1, wherein front sides of the first and second integrated circuit chips each include electronic functions.

3. The assembly of claim 1, further comprising an adhesive layer for attaching the back sides of the first and second integrated circuit chips to each other.

4. The assembly of claim 3, wherein the adhesive layer is a glass paste.

5. The assembly of claim 1, further comprising an adhesive film for attaching the back sides of the first and second integrated circuit chips to each other.

6. The assembly of claim 1, wherein the back sides of the first and second integrated circuit chips each include a metal layer and the metal layers are soldered to each other.

7. The assembly of claim 1, further comprising a molecular bond between the back side of the first integrated circuit chip and the back side of the second integrated circuit chip.

8. The assembly of claim 1, further comprising a substrate, wherein the front side of the first integrated circuit chip is mounted to the substrate.

9. The assembly of claim 8, further comprising:
    substrate contacts on the substrate;
    solder connections between the first plurality of electrical contacts present on the front side of the first integrated circuit chip and substrate electrical contacts of the substrate; and
    conductive wires electrically connecting the second plurality of electrical contacts present on the front side of the second integrated circuit chip to the substrate contacts.

10. The assembly of claim 1, wherein each of the first and second integrated circuit chips has an outer peripheral edge and wherein said first and second plurality of trenches are positioned offset from said outer peripheral edge.

* * * * *